May 11, 1926.
W. M. MANNING
1,584,114
JOURNAL BEARING
Filed June 9, 1924
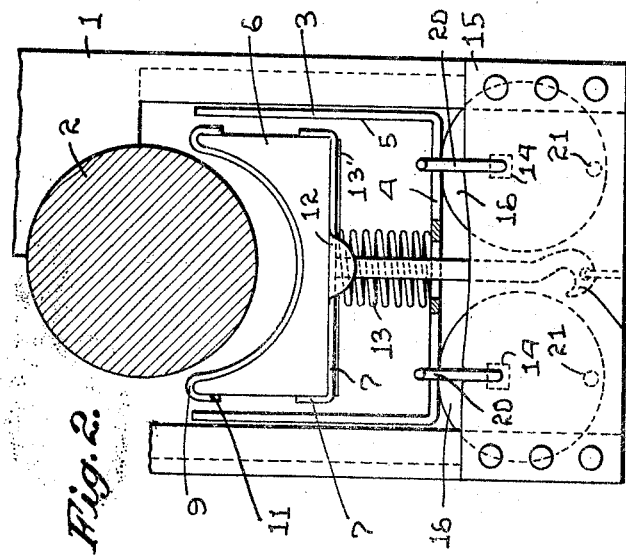
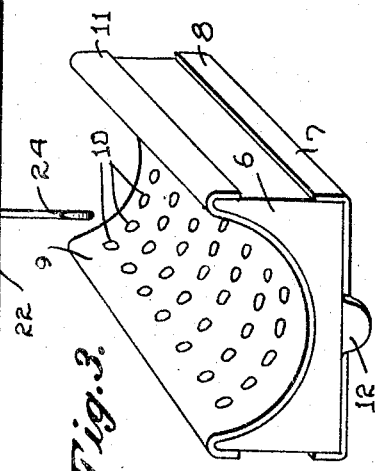
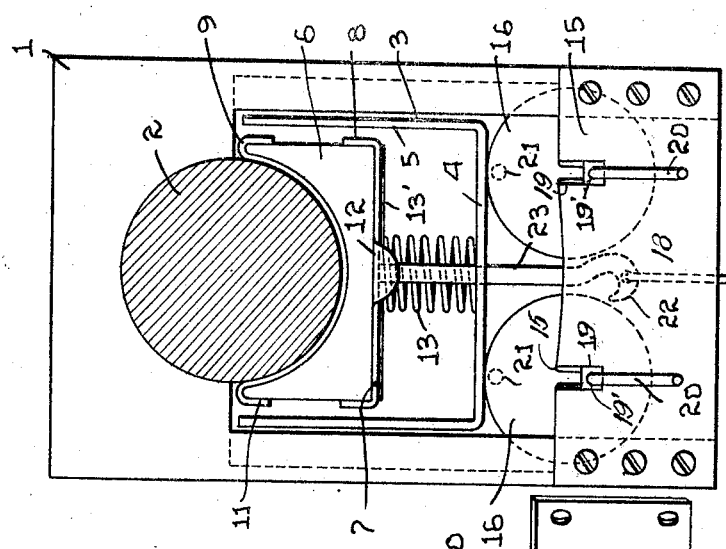
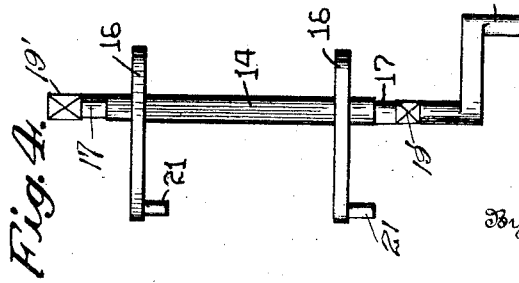
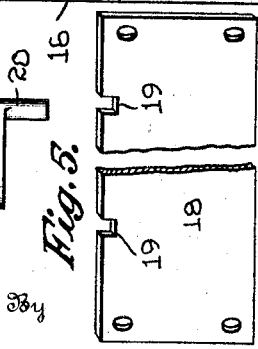
Inventor
W. M. Manning.
By J. P. Gordy
Attorney Patented May 11, 1926.

1,584,114

UNITED STATES PATENT OFFICE.

WILLIAM M. MANNING, OF SEATTLE, WASHINGTON.

JOURNAL BEARING.

Application filed June 9, 1924. Serial No. 718,973.

This invention relates to an improvement in journal bearings, and particularly to means for providing a lubricant therefor, combined with mechanism, whereby the worn lubricant may be readily and conveniently withdrawn from the cooperative relation with the journal and replaced with new lubricant at will.

The lubricant ordinarily employed in this type of lubrication is of solid form, though sufficiently plastic to be readily liquefied or softened under the action of the heat developed in the rotative movement of the journal. Such lubricant has been heretofore employed, and has been held under spring pressure to compensate for the wearing away of the lubricant in use. In such constructions however, it has been difficult to withdraw the worn lubricant body or to replace a fresh lubricant body, and it is primarily with a view to overcoming this objection that the present invention is designed.

For the purposes of the present invention, the lubricant body is supported as usual in a pan or the like, and this pan is supported on springs, which in turn are carried on a frame vertically movable in the journal, and supported to be manually raised or lowered at will. In raised position, the frame through the medium of the springs forces the pan and lubricant into contact with the journal, while in lowered position, the pan and lubricant are lowered from the journal and can be readily removed and replaced.

In the drawings:

Fig. 1 is a view in elevation, partly in section, showing the improved bearing, the lubricating means being shown in operative position.

Fig. 2 is a similar view with the lubricating means in inoperative position.

Fig. 3 is a perspective view of the lubricant pan, contained lubricant, and perforated top plate.

Fig. 4 is a plan view of one of the frame operating members.

Fig. 5 is a perspective view of the locking plate.

In the conventional illustration of journal box given, said box 1 is arranged to receive the journal 2 in the usual manner. Within the box is slidably mounted a frame 3 having a bottom 4 and side walls 5, the latter guiding the frame in movement in the box.

The lubricant, here shown as in brick or block form, as at 6, is supported in a pan 7, having upstanding side ledges 8 to hold the brick in place. The upper surface of the brick is concaved to conform to that of the journal, and a top plate 9, perforated at 10, is formed with side ledges 11 to fit over the sides of the brick to hold the plate in place. In the rotation of the journal, the heat produced through the friction with the top plate causes a melting of the lubricant of the brick, and the drawing of this melted lubricant through the openings 10, for lubricating the journal. The pan 7 is provided on its front edge with a depending lip 12, whereby the lubricating unit described may be withdrawn or inserted as an entirety.

The lubricating unit is arranged within the frame 3 and supported by coil springs 13 which bear on a plate 13' underlying the bottom 4 of the frame and beneath the pan 7. Shafts 14 are mounted for rotation in the front and rear plates 15 of the box. These shafts are provided with cam discs 16 near the front and rear plates of the box, which cam discs underlie the bottom 4 of the frame 3. The shafts 14 are formed with circular portions 17 to provide bearings for such shafts in the front and rear journal plates 15, said shafts in advance of such bearing portions being rectangular in section. Cover plates 18 are provided to be secured to the front face of the journal box, these plates being formed with rectangular recesses 19 in the upper edge, which are adapted to receive the rectangular portions of the shafts, and hold said shafts in set position when the cover or locking plates 18 are applied. It is understood that the locking plates 18 are applied over the plates 15 and that such locking plates are removed when it is desired to operate the structure.

The shafts 14 are provided with the usual crank handles 20, and the cam discs 16 are formed with inwardly projecting pins 21 adapted to engage hook terminals 22 on bars 23, which are swingingly supported from plate 13' and pass through slots in the bottom 4 of the frame 3. Indicators or telltales 24 depend from the hook terminals 22, these tell-tales serving as a means to visibly indicate the wear of the lubricant brick.

With the lubricant applied as indicated in Fig. 1, it will be apparent that the lubricant body is held in contact with the journal by means of the springs 13, and that said springs will compensate for the gradual reduction in thickness of the lubricant brick during lubrication of the journal.

During this relation of the parts, the cam discs 16 have been turned so that their portions of maximum radial dimension have been moved into contact with the bottom of the frame 3 and forced said frame to its upper limit. In this position, the shafts 14 are locked against rotative movement by engagement in the notches 19 of the locking plates.

When it is necessary to remove the lubricant brick, the locking plate is removed, and the shafts 14 turned by operation of the crank handle to lower the frame 3. If necessary, the rods 23 may be moved laterally to cause the pins 21 to engage the hooks 22 and thus operate to exert a downward pull upon the lubricant unit, should the latter for any reason stick in position. The shafts 14 are turned until the portion of minimum projection of the cam discs underlies the frame 3, when the parts will be in a position indicated in Fig. 2, and the lubricant unit as a whole may be readily removed by grasping the lip 12.

The tell-tales 24, by their projection below the journal box, serve to indicate to the observer the condition of wear of the lubricant brick, and hence the necessity of replacing the same.

Claims:

1. In a journal bearing, the combination of a brick of lubricant, a pan containing the same, a perforated top which fits the journal, a movable frame, a spring between the frame and the pan which urges the pan upwardly toward the journal, and means for adjustably holding the frame in raised position including a set of cams.

2. In a journal bearing, the combination of a brick of lubricant, a pan containing the same, a perforated top which fits the journal, a movable frame, a spring between the frame and the pan which urges the pan upwardly toward the journal, and means for adjustably holding the frame in raised position, including a set of cams, and means for locking the cams against retrograde movement.

3. In a journal bearing, the combination of a brick of lubricant, a pan containing the same, a perforated top which fits the journal, a movable frame, a spring between the frame and the pan which urges the pan upwardly toward the journal, and means for adjustably holding the frame in raised position, including a set of cams, and means for locking the cams against retrograd movement, said locking means including a face plate having locking seats for the spindles of the cams.

4. In a journal bearing, the combination of a concaved brick of lubricant, a perforated cover therefor, a pan into which the lubricant fits, a frame vertically slidable within the bearing, a spring between the floor of the frame and the pan, cam means for holding the frame in raised position, and means for locking the cams in such position.

5. In a journal bearing, the combination of a concaved brick of lubricant, a perforated cover therefor, a pan into which the lubricant fits, a frame vertically slidable within the bearing, a spring between the floor of the frame and the pan, cam means for holding the frame in raised position, and removable means for locking the cams in such position.

In testimony whereof I affix my signature.

WILLIAM M. MANNING.